United States Patent
Bucknell et al.

(10) Patent No.: US 7,944,935 B2
(45) Date of Patent: May 17, 2011

(54) METHOD FOR PRIORITY BASED QUEUING AND ASSEMBLING OF PACKETS

(75) Inventors: Paul Bucknell, Brighton (GB);
Matthew P. J. Baker, Canterbury (GB);
Timothy J. Moulsley, Caterham (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 520 days.

(21) Appl. No.: 11/718,720

(22) PCT Filed: Nov. 4, 2005

(86) PCT No.: PCT/IB2005/053618
§ 371 (c)(1),
(2), (4) Date: May 7, 2007

(87) PCT Pub. No.: WO2006/051465
PCT Pub. Date: May 18, 2006

(65) Prior Publication Data
US 2007/0297435 A1    Dec. 27, 2007

(30) Foreign Application Priority Data

Nov. 11, 2004    (GB) .................................. 0424918.1

(51) Int. Cl.
*H04L 12/28*    (2006.01)
*H04L 12/54*    (2006.01)
*H04L 12/56*    (2006.01)

(52) U.S. Cl. .................. 370/412; 340/417; 340/429
(58) Field of Classification Search .................. 370/229, 370/412, 417, 429
See application file for complete search history.

(56) References Cited

U.S. PATENT DOCUMENTS

| | | | | |
|---|---|---|---|---|
| 2002/0097733 A1* | 7/2002 | Yamamoto | ..................... | 370/412 |
| 2004/0022188 A1* | 2/2004 | Abel et al. | ..................... | 370/229 |
| 2005/0111361 A1* | 5/2005 | Hosein | ..................... | 370/230 |

* cited by examiner

*Primary Examiner* — Pankaj Kumar
*Assistant Examiner* — Lonnie Sweet
(74) *Attorney, Agent, or Firm* — Larry Liberchuk

(57) ABSTRACT

Data packets having different assigned priorities are multiplexed by operating a queue for each different priority of data packet and assembling groups (80) of the data packets for transmission. Each group has two portions. A first portion (90) of the group is populated with data packets selected from one or more of the queues according to a first rule and a second portion (95) of the group is populated with data packets selected from one or more of the queues according to a second rule. Preferably the first portion contains data packets having the highest priority, and the second portion contains a selection of the data packets having a lower a priority. Selection of data packets for the second portion may depend on criteria such as delay experienced and queue length. The size of the first and second portions may be adapted according to delay experienced and queue length.

18 Claims, 2 Drawing Sheets

METHOD FOR PRIORITY BASED QUEUING AND ASSEMBLING OF PACKETS

The invention relates to a method of multiplexing data packets, to a multiplexing apparatus for multiplexing data packets, to a communication terminal comprising the multiplexing apparatus, and to a communication system comprising the communication terminal. The invention has application in, for example but not exclusively, mobile communication systems such as the Universal Mobile Telecommunication System (UMTS).

There is a requirement in communication systems to multiplex data packets having different priorities. For example, in UMTS for an Enhanced Uplink Data Channel (E-DCH), at the Medium Access Control (MAC) layer data packets, referred to as MAC-d Protocol Data Units or MAC-d PDUs, are grouped together for transmission to form larger, enhanced PDUs termed MAC-e PDUs. When there is a continuous supply of MAC-d PDUs having the highest priority, the MAC-e PDUs can be filled with these high priority MAC-d PDUs, but when there are fewer high priority MAC-d PDUs to be transmitted, any spare capacity in the MAC-e PDUs can be used to transmit waiting MAC-d PDUs having a lower priority. In this way, a MAC-e PDU can accommodate a combination of different priorities of MAC-d PDU.

In UMTS, the process of multiplexing of MAC-d PDUs into MAC-e PDUs is responsible for ensuring that MAC-d flow priorities are taken into account in an appropriate way. In the simplest case, this multiplexing could simply follow the priorities directly. An example illustrated in FIG. 1 shows queues 5 of MAC-d PDUs having different priorities $P_1 \ldots P_n$, with the priorities decreasing from $P_1$ through to $P_n$, being multiplexed by a selector switch 6 onto a MAC-e PDU 7. The MAC-e PDU can accommodate four MAC-d PDUs, and is populated with the MAC-d PDUs having the highest priority available. In this simple scheme if we have continuous high-priority MAC-d PDUs arriving for transmission, then the transmission of simultaneously-arriving lower-priority MAC-d PDUs will be delayed. Strictly priority-based multiplexing of MAC-d PDUs into the MAC-e PDUs will not always lead to the optimal filling of the MAC-e PDUs and would be too inflexible to satisfy all QoS (Quality of Service) requirements for PDUs, such as delay requirements and bit rate requirements. For example, queues containing low priority PDUs may experience starvation, being starved of opportunities to transmit their PDUs.

An object of the invention is to enable flexible and efficient multiplexing of data packets.

According to a first aspect of the invention there is provided a method of multiplexing data packets having different assigned priorities, comprising: receiving data packets; operating a queue for each different priority of data packet; assembling a group of the data packets wherein a first portion of the group is populated with data packets selected from one or more of the queues according to a first rule and a second portion of the group is populated with data packets selected from one or more of the queues according to a second rule; and transmitting the group.

The invention provides flexibility for appropriate handling of priorities, guaranteed bit-rates and starvation scenarios by dividing a data packet, such as a MAC-e PDU, that is large enough to accommodate a plurality of smaller data packets, such as MAC-d PDUs, into at least two portions and enabling different multiplexing rules to be used for the different portions. In this way, a combination of data packets having different priorities may be transmitted.

Preferably, according to the first rule, data packets are selected from the queue containing the highest priority of the data packets. This ensures that the highest priority data packets are assigned a regular portion of the capacity.

Preferably, according to the second rule, data packets are selected from one or more of the queues containing data packets having a lower priority than the highest priority. This ensures that the lower priority data packets are assigned some capacity.

In one embodiment, according to the second rule, data packets are selected from any queue, except at least the highest priority queue, for which the data packets have experienced a delay longer than a threshold delay. The threshold delay may be the same or different for the queues. This approach can assist compliance with a QoS delay requirement.

In one embodiment, according to the second rule, data packets are selected from any queue which has more data awaiting transmission than a threshold amount of data, except at least the highest priority queue. This approach can reduce the likelihood of buffer overrun in which a queue length exceeds the available buffer size.

In one embodiment, the sizes of the first and second portions of the group of data packets transmitted is adapted according to the prevailing mix of priorities of the data packets, or according to the amount of data in the queues, or according to the delay experienced by data in each queue relative to a delay criterion for the respective queue. This approach can enable efficient use of transmission capacity and can assist compliance with a QoS requirement.

According to a second aspect of the invention there is provided a multiplexing apparatus for multiplexing data packets having different assigned priorities, comprising means for receiving data packets, means for operating a queue for each different priority of data packet, means for assembling a group of the data packets wherein a first portion of the group is populated with data packets by selecting data packets from one or more of the queues according to a first rule and a second portion of the group is populated with data packets by selecting data packets from one or more of the queues according to a second rule, and means for transmitting the group.

According to a third aspect of the invention there is provided a communication terminal comprising the multiplexing apparatus in accordance with the second aspect of the invention.

According to a fourth aspect of the invention there is provided a communication system comprising, for transmitting data packets, a first communication terminal in accordance with the second aspect of the invention, and a second communication terminal for receiving the data packets.

The invention will now be described, by way of example, with reference to the accompanying drawings wherein.

Figure 1:
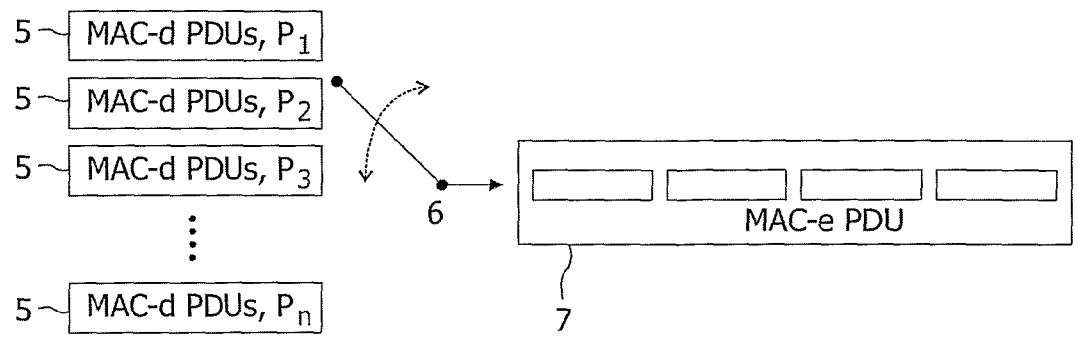
FIG. 1 is a schematic diagram illustrating a prior art method of MAC-d multiplexing.
Figure 2:
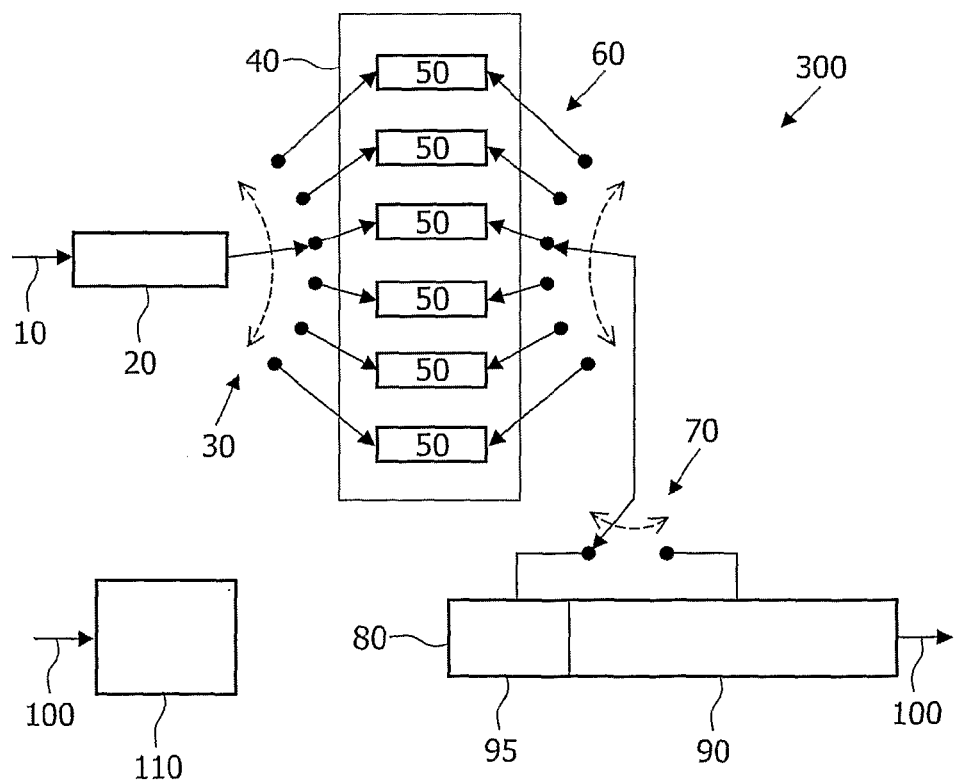
FIG. 2 is a multiplexing apparatus in accordance with the invention.

Referring to FIG. 2, there is illustrated an apparatus for multiplexing 300, hereafter referred to as a multiplexing apparatus 300. There is an input 10 for receiving data packets. Coupled to the input 10 is an input buffer 20, such as a random access memory, for storing the received data packets. There is a bank 40 of a plurality of queue stores 50 for containing queues and which may comprise a storage medium such as random access memory. The input buffer 20 is coupled to the bank 40 by means of a first routing means 30, such as a switch or a functional equivalent, for routing each data packet from the input buffer 20 to one of the queue stores 50 according to a priority assigned to each data packet. The priority may be assigned to each data packet prior to reception of the data packet, or may be assigned by a control means 110. Alternatively, the packets may be routed to the queue stores 50 according to their respective MAC-d flows, with each flow having an associated priority; this approach may be used if for example the flow priorities are changed dynamically. There is an output buffer 80, such as a random access memory, for storing the data packets prior to transmission on an output 100. The output buffer 80 comprises a first portion 90 and a second portion 95. The first portion 90 and the second portion can each accommodate at least one data packet. Data packets are selected for transfer from the queue stores 50 to the output buffer 80 by means of a second routing means 60, such as a switch or a functional equivalent, and are transferred into the first portion 90 or the second portion 95 by means of a switch 70. The first and second routing switches 30, 60 and the switch 70 are controlled by a control means 110, such as a microprocessor. The control means 110 controls the routing of the data packets to the output buffer 80 according to a predetermined criterion. The control means 110 may also control the sizes of the first and second portions 90, 95.

The control means 110 may be adapted to populate the first portion 90 with data packets from the queue store 50 containing the highest priority data packets.

The control means 110 may be adapted to populate the second portion 95 with data packets from one or more of the queue stores 50 containing data packets of a lower priority than the highest priority. The lower priority data packets selected to populate the second portion 95 may be those which have experienced a delay longer than a predetermined delay threshold, or those that have experienced the longest delay. The predetermined delay threshold may be different or the same for each of the queue stores 50. The lower priority data packets selected to populate the second portion 95 may be those in a queue store 50 which contains a number of data packets above a predetermined occupancy threshold. The predetermined occupancy threshold may be different or the same for each of the queue stores 50. The selection of data packets to populate the second portion 95 need not be in order of priority.

The control means 110 may adapt the size of the first portion 90 and the second portion 95 according to the prevailing mix of priorities of the data packets stored in the bank 40, or according to the amount of data packets stored in the queue stores 50, or according to the delay experienced by data packets in each queue store 50 relative to a delay criterion for the respective queue, or according to a received signal indicative of a mix of first and second portions. In the latter case, the mix may comprise, for example, an indication of relative proportions or absolute sizes.

Figure 3:
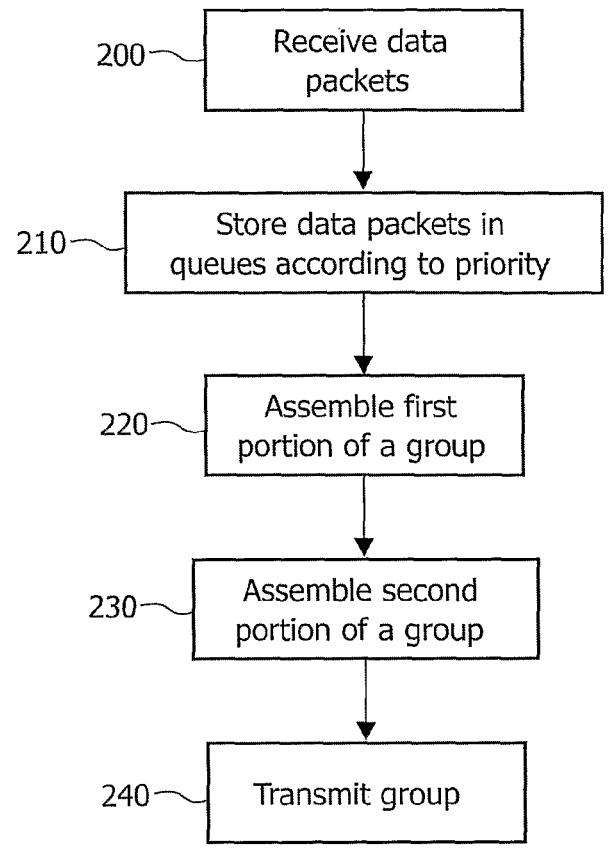
FIG. 3 is a flow chart illustrating a further method of multiplexing in accordance with the invention.

Referring to FIG. 3, the illustrated method of multiplexing commences at step 200 where some data packets are received by the multiplexing apparatus 300. They may be received with priorities already assigned to them, or priorities may be assigned after receipt. At step 210 the data packets are stored into the set of queue stores 50, one queue store for each priority level $P_1 \ldots P_n$. One way of identifying which queue store 50 a data packet is stored in is by a label signifying the packet's priority level. At step 220 a first portion 90 of a group of data packets is assembled from data packets having the highest priority of the stored data packets. At step 230 a second portion 95 of a group of data packets is assembled from data packets having a lower priority, or lower priorities. At step 240 the assembled group comprising the first portion 90 and second portion 95 is transmitted. The process is repeated for further data packets.

Some examples are given below of how the data packets may be selected from the queues in the queue stores 50 to populate the group of data packets assembled in the first portion 90 and second portion 95 of the output buffer 80. In general we can assume that the resources available for the first portion 90 and the second portion 95 are both known before the multiplexing operation is carried out, for example in terms of the number of PDU's which can be transmitted. In the case that the resources are not known exactly in advance, for example if the total available resource depends in any way on the outcome of the multiplexing, it may be necessary to consider the outcome of the multiplexing for a number of possible resource allocations and then select one of them.

1) Strict priority based selection: In this case each MAC-d flow is assigned a priority. Then for the first selection, data packets are taken from the queue having the highest priority until the resource available for the first portion 90 is filled. If this queue becomes empty, data packets are taken from the queue with the next highest priority and so on. For the second portion 95 the same procedure is carried out, but for a subset of the queues. Suitable selection of the subset can enable the multiplexing apparatus 300 to avoid starvation of particular queues, for example to enable a delay criterion to be met.
2) Fair selection for the second portion: In this case the second portion 95 is populated by taking one data packet in turn from each of the subset of queues, excluding the highest priority queue. To maximise fairness, especially when a large number of queues are present, the last selected queue may be remembered for use in subsequent multiplexing operations.
3) As a variation on 2), if the resource available for the first portion 90 is not fully used, then the unused resource can be made available for the second portion 95.
4) As a further variation on 2), the second portion 95 can be populated before the first portion 90. This may allow some flexibility in regard to which queues make use of which of the portions.
5) The first and second portions 90, 95 could be populated from different subsets of the queues.
6) The priorities can modified in a dynamic way, for example in response to commands or information received by the multiplexing apparatus 300. Such modification can be applied to either or both of the first and second portions 90, 95. For example, if the transmission delay of a particular queue increases above a particular threshold, the priority of that queue may be temporarily increased in order to enable data from that queue to use a different one of the portions.
7) One or both selections for the first and second portions 90, 95 can be based on the amount of data in the respective queues, for example assigning highest priority to the queue with most data.
8) Length of queue can be used to arbitrate between queues of equal priority, for example by selecting from the longest queue.
9) One or both selections for the first and second portions 90, 95 can be modified to take into account the length of queue, for example by preferentially selecting from queues exceeding a certain length.
10) The selection can be based on the QoS currently achieved for a particular data flow. For example, data can be preferentially selected from a queue where the average or worst case delay is exceeding a QoS requirement.

11) The size of the resource for each portion 90, 95 can be adapted to take into account the amount of data in each queue, for example dividing the resource in a way which is proportional to the amount of data in the relevant queues.
12) The size of the resource for each portion 90, 95 can be adapted to take into account the QoS requirements of the data in each queue, for example dividing the resource in a way which gives more resource to the selection which has the strictest QoS requirements.
13) The size of the resource for each portion 90, 95 can be adapted to take into account the QoS currently being achieved for the data in each queue, for example dividing the resource in a way which gives more resource to the portion 90, 95 which is not meeting, or is furthest from meeting, any delay requirements.

Criteria other than priority may be used to determine which queue store 50 each data packet is assigned to, for example, type of data or a quality of service requirement of the data packet. In this case the data packets do not need to have an explicit priority assigned to them, instead data type functioning as an equivalent characteristic to priority, or instead the data type defining an implicit priority. Similarly, criteria other than priority may be used to determine which of the first and second portions 90, 95 each data packet may be assigned to.

Figure 4:
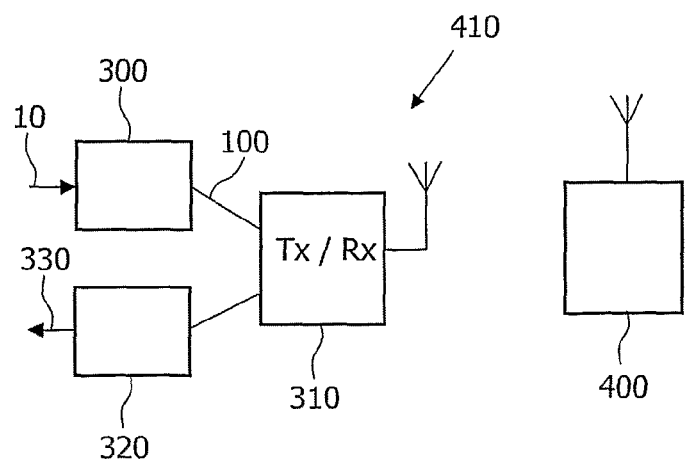
FIG. 4 is a communication system in accordance with the invention.

Referring to FIG. 4, there is illustrated a communication system comprising a communication terminal 410 for transmitting data and a communication terminal 400 for receiving the transmitted data. The communication terminal 410 for transmitting data comprises the apparatus for multiplexing 300 as described above with reference to FIG. 2 coupled to a transceiver 310 for transmitting data and receiving acknowledgements, and a processor 320 for processing the received acknowledgements and delivering a signal on an output 330.

The multiplexing apparatus 300 may be adapted to receive on an input 100, for example via the transceiver 310, a signal indicative of a mix of first and second portions 90, 95, and may be adapted to set the size of the first and second portions 90, 95 in response to the signal. The multiplexing apparatus 300 may be adapted to receive on an input 100, for example via the transceiver 310, a signal indicative of how the data packets may be selected from the queue stores 50 to populate the group of data packets assembled in the first portion 90 and second portion 95 of the output buffer 80, and to adapt its operation in accordance with the signal. Such signals may be transmitted by the communication terminal 400 or another source.

Although the invention has been described with the output buffer 80 having a first portion 90 and a second portion 95, the use of additional portions is not precluded, and the techniques described may be applied to populating the additional portions.

Although the invention has been described with reference to UMTS, its use is not limited to UMTS, and it can be used in other communication systems, particularly in mobile communication systems. The use of the invention is not limited to wireless communication systems.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of data communication which may be used instead of or in addition to features already described herein.

The invention claimed is:

1. A microprocessor-based method of multiplexing data packets having different assigned priorities, comprising:
   receiving data packets;
   operating a queue for each different priority of data packet;
   assembling a group of the data packets wherein a first portion of the group is populated with data packets selected from one or more of the queues according to a first rule and a second portion of the group is populated with data packets selected from one or more of the queues according to a second rule; and
   transmitting the group, wherein the size of the first and second portions is adapted according to the delay experienced by data in each queue relative to a delay criterion for the respective queue.

2. The method of multiplexing as claimed in claim 1 wherein according to the first rule data packets are selected from the queue containing the highest priority of the data packets.

3. The method of multiplexing as claimed in claim 1, wherein according to the second rule data packets are selected from one or more of the queues containing data packets having a lower priority than the highest priority.

4. The method of multiplexing as claimed in claim 1, wherein according to the second rule data packets are selected from any queue, except at least the highest priority queue, for which the data packets have experienced a delay longer than a threshold delay.

5. The method of multiplexing as claimed in claim 1, wherein according to the second rule data packets are selected from any queue which has more data awaiting transmission than a threshold amount of data, except at least the highest priority queue.

6. The method of multiplexing as claimed in claim 1, comprising adapting the size of the first and second portions according to the prevailing mix of priorities of the data packets.

7. The method of multiplexing as claimed in claim 1, comprising adapting the size of the first and second portions according to the amount of data in the queues.

8. The method of multiplexing as claimed in claim 1, comprising receiving a signal indicative of a mix of first and second portions and adapting the size of the first and second portions in response to the signal.

9. A multiplexing apparatus for multiplexing data packets having different assigned priorities, comprising:
   means for receiving data packets;
   means for operating a queue store for each different priority of data packet;
   means for assembling a group of the data packets wherein a first portion of the group is populated with data packets by selecting data packets from one or more of the queue stores according to a first rule and a second portion of the group is populated with data packets by selecting data packets from one or more of the queue stores according to a second rule; and
   means for transmitting the group, wherein the size of the first and second portions is adapted according to the delay experienced by data in each queue relative to a delay criterion for the respective queue.

10. The multiplexing apparatus as claimed in claim 9 wherein according to the first rule data packets are selected from the queue store containing the highest priority of the data packets.

11. The multiplexing apparatus as claimed in claim 9, wherein according to the second rule data packets are selected from one or more of the queue stores containing data packets having a lower priority than the highest priority.

12. The multiplexing apparatus as claimed in claim 9, wherein according to the second rule data packets are selected from any queue store, except at least the highest priority queue store, for which the data packets have experienced a delay longer than a threshold delay.

13. The multiplexing apparatus as claimed in claim 9, wherein according to the second rule data packets are selected from any queue store which has more data awaiting transmission than a threshold amount of data, except at least the highest priority queue store.

14. The multiplexing apparatus as claimed in claim 9, comprising means for adapting the size of the first and second portions according to the prevailing mix of priorities of the data packets.

15. The multiplexing apparatus as claimed in claim 9, comprising means for adapting the size of the first and second portions according to the amount of data in the queue stores.

16. The multiplexing apparatus as claimed in claim 9, comprising means for receiving a signal indicative of a mix of first and second portions and means for adapting the size of the first and second portions in response to the signal.

17. A communication terminal comprising the multiplexing apparatus as claimed in claim 9.

18. A communication system comprising a first communication terminal as claimed in claim 17 for transmitting data packets, and a second communication terminal for receiving the data packets.

* * * * *